April 2, 1935.  C. H. DEDERICK  1,996,571
MULTISPEED SPLIT PHASE MOTOR
Filed Sept. 18, 1931   2 Sheets-Sheet 2

Inventor
Clinton H. Dederick
by Rippey & Kingsland
His Attorneys.

Patented Apr. 2, 1935

1,996,571

UNITED STATES PATENT OFFICE 1,996,571

MULTISPEED SPLIT PHASE MOTOR

Clinton H. Dederick, St. Louis, Mo., assignor to The Emerson Electric Mfg. Co., St. Louis, Mo., a corporation of Missouri Application September 18, 1931, Serial No. 563,570

7 Claims. (Cl. 172—278)

This invention relates to split phase alternating current induction motors.

An object of this invention is to provide an improved motor of the alternating current split phase type that will have a plurality of synchronous speeds, and more particularly to provide such a motor which will have an improved starting torque.

Further objects will appear from the following detail description taken in connection with the accompanying drawings, in which—

Figure 1:
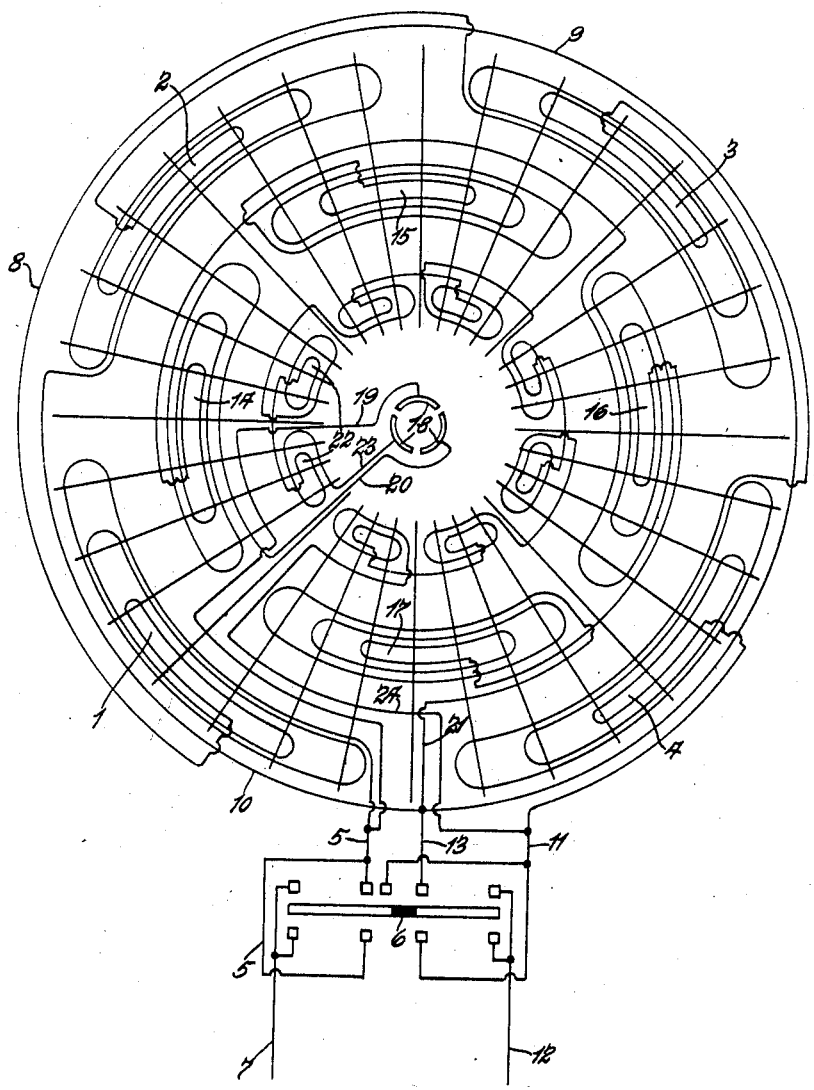
Fig. 1 is a diagram of one embodiment of this invention.

In the drawings and description the invention is exemplified in motors having four main windings, but it will be understood that this is merely illustrative as the invention may be embodied in a motor employing any number of main windings.

The motor consists of a frame with a wound field and an armature which may preferably be of the squirrel cage type.

Each of the motors illustrated and described have main primary windings of low ohmic resistance and phase-displaced auxiliary windings of high ohmic resistance.

The main windings are so arranged and connected that for operation on high speed each alternate winding is of like polarity but of opposite polarity from the other windings. For low speed operation the main windings are so connected that some of them are reversed in polarity from the other windings, thus producing consequent poles between some or all of the windings. One set of phase-displaced windings are displaced from the main windings and arranged to give a starting torque for high speed operation and having but little effect when the motor is connected for low speed. Another set of phase displaced windings are provided to give a starting torque for low speed and performing no function when the motor is connected for high speed. An automatic cut-out mechanism is employed and is effective with either connection of the main windings to cut out the phase-displaced windings after the motor has reached a definite speed.

The embodiment illustrated in Fig. 1 may be first described. Main windings 1, 2, 3 and 4 are provided. The winding 1 has a lead 5 for connection by a switch 6 to a lead 7 of a power circuit. The winding 1 is connected by a wire 8 to the winding 3, which is so constructed and connected as to have the same polarity as the winding 1. The windings 2 and 4 are connected by a wire 9 and are so constructed and connected as to have the same polarity. A wire 10 connects the winding 2 with the winding 3 in such a manner that when current flows between the windings 2 and 3 through the wire 10 all of the windings will be connected in series and all the windings will be of like polarity. A lead 11 is connected to the winding 4 and is adapted to be connected by the switch 6 to a lead 12, opposite from the lead 7 of the power circuit for low speed operation, or to the lead 7 of the power circuit for high speed operation.

A lead 13 is connected to the wire 10 and is adapted to be connected by the switch 6 to the lead 12 for high speed operation of the motor but disconnected for low speed operation. Thus for high speed operation, current will flow from the lead 7 through the lead 5, the winding 1, the wire 8, the winding 3, the wire 10, the lead 13 and the switch 6 to the lead 12 of the power circuit. Another circuit connected in parallel with the circuit just described provides a path for current from the lead 7, through the lead 11, the winding 4, the wire 9, the winding 2, the wire 10, the lead 13, and the switch 6 to the lead 12 of the power circuit. This arrangement for high speed operation places the windings 1 and 3 of like polarity in parallel with the windings 2 and 4 of like polarity one with the other but differing in polarity from windings 1 and 3.

It will be obvious from the preceding description of the arrangement and connection of the main windings in the embodiment illustrated in Fig. 1 that when the connection is made for high speed operation as described the machine will operate as a four pole motor and when connected for low speed operation as indicated and described consequent poles will be produced between the windings and the machine will operate as an eight pole motor.

A series of starting windings 14, 15, 16 and 17 are displaced 90 electrical degrees, calculated when the motor is connected for high speed operation, from the main windings 1, 2, 3 and 4, respectively. The starting windings are connected in series and are constructed and connected in such a manner that each winding is of opposite polarity from its adjacent windings.

The machine is provided with an automatic cut-out 18 arranged and adapted to cut out the starting windings after the motor has reached a definite speed. In this cut-out, three conductor segments spaced 120 degrees are provided instead of the usual two segments spaced 180 degrees. Otherwise the construction and operation of the cut-out mechanism are well known and it is unnecessary to describe it in detail. One of the segments of the cut-out mechanism 18 is connected by a wire 19 to the lead 5 and another segment is connected by a wire 20 to the winding 14. A wire 21 is connected between the winding 17 and the wire 10. Thus when the switch 6 is closed for high speed operation, current will flow from the lead 7 of the power circuit through the switch 6, the lead 5, the wire 19, the automatic cut-out 18, the wire 20, the windings 14, 15, 16 and 17, the wire 21, the lead 13 and the switch 6 to the lead 12 of the power circuit.

When the motor is operating on the low speed connection, or as an eight pole machine, in starting some current will flow through the windings 14, 15, 16 and 17, because this series is connected across one-half of the line voltage and thus approximately one-half of its normal current will flow. This current will also flow through one-half of the main windings, thus strengthening these poles and producing with other phase displaced windings, which will presently be described, a slightly better starting torque than without their presence.

A separate series of starting windings 22 are provided to produce an effective starting torque when the machine is operated in low speed or as an eight pole machine. The windings 22 are displaced 90 electrical degrees from the main poles calculated when the machine is connected as an eight pole motor. The windings 22 are connected in series, one side of the circuit being connected by a wire 23 to the third segment of the cut-out 18 and the other side being connected by a wire 24 to the lead 11. Thus when the machine is connected for low speed operation the series of windings 22 are connected in parallel with the main windings, but when the machine is connected for high speed operation both ends of the series of windings 22 are connected to the same side of the power circuit through lead 7, and therefore no current will flow through the windings 22.

The preceding description of the embodiment illustrated in Fig. 1 refers to a motor in which for low speed operation consequent poles are produced between each pair of adjacent windings. The embodiment there illustrated is related to the invention illustrated and described in my application, Serial No. 464,721, filed June 30, 1930, in which application I have claimed the common subject matter which is generally the combination of a plurality of main windings with means for selectively reversing the polarity of alternate windings.

Figure 2:
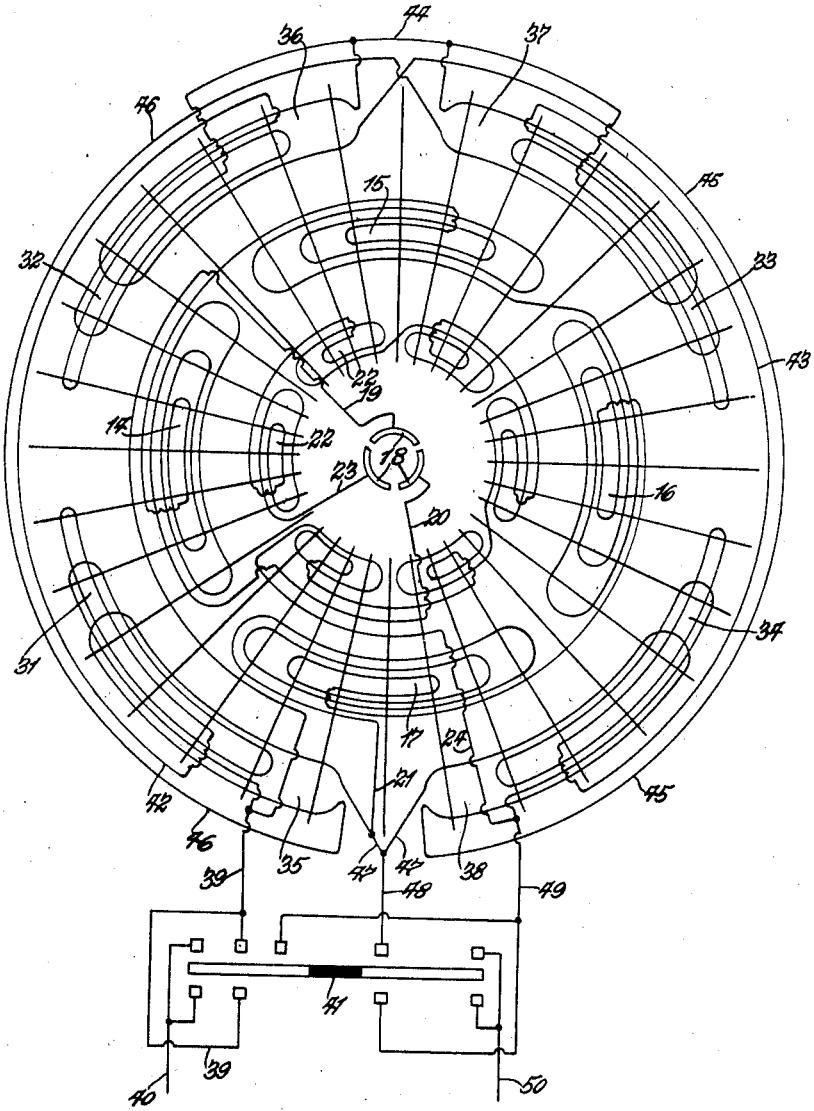
Fig. 2 is a diagram of another embodiment of this invention.

In the embodiment illustrated in Fig. 2, the speed characteristic of the motor is so changed by changing the polarity of some of the main windings, but in this embodiment consequent poles are produced between some only of the main windings. In a motor having four main windings, as illustrated, two consequent poles only are produced, thus changing the machine from a four pole motor when operating on high speed to a six pole motor when operating with low speed connections.

The embodiment illustrated in Fig. 2 is related to the invention illustrated and described in my joint application with Wilbur R. Appleman, Serial No. 520,775, filed March 7, 1931, in which application I have claimed the common subject matter which is generally the combination of a plurality of main windings with means for selectively reversing the polarity of certain adjacent main windings.

The embodiment illustrated in Fig. 2 will now be described in detail. Main windings 31, 32, 33 and 34 and auxiliary windings 35, 36, 37 and 38 are provided. Winding 31 has a lead 39 for connection to one lead 40 of a power circuit by a switch 41. Winding 31 is connected by a wire 42 to the winding 32 which is so constructed as to have a polarity opposite that of winding 31. Windings 33 and 34 are connected by a wire 43 and are so constructed and connected as to have opposite polarities. Windings 32 and 33 are conected by a wire 44. One side of each of the auxiliary windings 36 and 37 is connected to the wire 44; the other side of auxiliary winding 36 is connected by a wire 45 to the auxiliary winding 38. The other side of the auxiliary winding 37 is connected by a wire 46 to auxiliary winding 35. The auxiliary windings 35 and 38 are connected by a wire 47. The wire 47 has a lead 48 through which it may be connected by the switch 41 to a lead 50 opposite the lead 40 of the power circuit. This connection is made for high speed operation but is open for low speed operation. A lead 49 is connected to the winding 34 and is adapted to be connected by the switch 41 to the lead 40 of the power circuit for high speed operation and to the lead 50 of the power circuit for low speed operation.

It is to be understood that the main windings and the auxiliary windings are so arranged as to produce for four pole operation even spacing of the resultant poles. The main windings are so arranged and spaced without the use of the auxiliary windings to produce six poles evenly spaced when the machine is connected for low speed operation. The auxiliary main windings 35, 36, 37 and 38 are not in circuit when the machine is connected for low speed.

Each of the auxiliary main windings is, of course, of the same polarity as its appropriate main winding. When the machine is connected for high speed operation main windings 31 and 32 are in series and parallel with windings 33 and 34 in series with each other. The circuit is completed through auxiliary windings 36 and 38 in series with each other and through auxiliary windings 35 and 37 also in series with each other, the circuit being completed through the lead 48. For low speed operation main windings 31, 32, 33 and 34 are connected in series in the order named with the windings 31 and 34 of like polarity and differing from the polarity of windings 32 and 33, thus producing consequent poles between the windings 32 and 33 and between the windings 31 and 34.

Starting windings 14, 15, 16 and 17 are provided and spaced 90 degrees, respectively, from the four poles as they are located when the machine is operating as a four pole machine. A plurality of starting windings 22 are provided, equal in number to poles when the machine is arranged for low speed operation, six in number as shown in the particular embodiment illustrated in Fig. 2. The starting windings are arranged and connected in the same manner in this embodiment as in the preceding embodiment illustrated in Fig. 1.

It will be understood that this invention provides an induction motor having a plurality of main windings on the primary, some of which may be changed in polarity to produce consequent poles; a plurality of starting windings are provided equal in number to the main windings and displaced, respectively 90 electrical degrees there-from; a second set of starting windings are provided which are displaced approximately 90 electrical degrees, respectively from the poles as situated when the main windings are connected for low speed operation; connections are provided whereby a control switch connects the windings in circuit with the source of power supply, serves to change the speed characteristics of the motor, and connects the appropriate set of starting windings; and an automatic cut-out is provided so constructed and arranged as to cut out all of the starting windings.

It is to be understood that parts of the invention may be used without the whole, and that various changes and modifications may be made within the scope of the appended claims without departing from the spirit of this invention.

I claim:

1. In an induction motor having main windings on the primary with means for selectively changing the polarity of some of the windings to produce consequent poles thus changing the speed characteristics of the motor, a plurality of starting windings equal in number to the poles produced by the main windings when connected for high speed operation and each displaced 90 degrees from one of said poles, and a plurality of starting windings equal in number to the poles produced by the main windings when connected for low speed operation and each displaced approximately 90 degrees from one of the last named poles.

2. In an induction motor having main windings on the primary with means for selectively changing the polarity of some of the main windings to produce consequent poles thus changing the speed characteristics of the motor, a plurality of starting windings effective to produce a starting torque when the main windings are connected for high speed operation, a separate set of starting windings effective to produce a starting torque when the main windings are connected for low speed operation, and connections with said means whereby the appropriate set of starting windings are connected in circuit simultaneously with the operation of said means.

3. In an induction motor having main windings on the primary with means for selectively changing the polarity of some of the windings to produce consequent poles thus changing the speed characteristics of the motor, a plurality of starting windings equal in number to the main windings each of which is phase displaced from an adjacent main winding, a separate set of starting windings equal in number to the poles produced by the main windings when connected for low speed operation and each of which is phase displaced from one of said poles, and connections with said means whereby the appropriate set of starting windings is connected in circuit simultaneously with the operation of said means.

4. In an induction motor having main windings on the primary with means for selectively changing the polarity of some of the main windings to produce consequent poles thus changing the speed characteristics of the motor, a plurality of starting windings effective to produce a starting torque when the main windings are connected for high speed operation, a separate set of starting windings effective to produce a starting torque when the main windings are connected for low speed operation, connections with said means whereby the appropriate set of starting windings are connected in circuit simultaneously with the operation of said means, and means for disconnecting said starting windings comprising an automatic cut-out having three separable segments, a connection from one of the segments to a source of power supply, a connection from another of said segments to the first mentioned set of starting windings, and a connection from the other segment to the second mentioned set of starting windings whereby said automatic cut-out will be effective to disconnect all of the starting windings when the motor reaches a predetermined speed.

5. In an induction motor having a plurality of main windings on the primary with leads to said windings and a switch for connecting the leads to a power circuit and arranged with connections whereby the polarity of some of the windings may be reversed to produce consequent poles and thus change the speed characteristics of the motor, a plurality of starting windings effective to produce a starting torque when the main windings are connected by said switch for high speed operation, a separate set of starting windings effective to produce a starting torque when the main windings are connected for low speed operation, and connections between said windings and said switch arranged and adapted to connect in circuit the appropriate starting windings simultaneously with the operation of said switch.

6. In an induction motor having a plurality of main windings on the primary with leads to said windings and a switch for connecting the leads to a power circuit and arranged with connections whereby the polarity of some of the windings may be reversed to produce consequent poles and thus change the speed characteristics of the motor, a plurality of starting windings effective to produce a starting torque when the main windings are connected by said switch for high speed operation, a separate set of starting windings effective to produce a starting torque when the main windings are connected for low speed operation, and means for disconnecting said starting windings comprising an automatic cut-out having three separable segments, a connection from one of the segments to a source of power supply, a connection from another of said segments to the first mentioned set of starting windings, and a connection from the other segment to the second mentioned set of starting windings whereby said automatic cut-out will be effective to disconnect all of the starting windings at a predetermined motor speed.

7. In an induction motor having main windings on the primary with means for selectively changing the polarity of some of the windings to produce consequent poles thus changing the speed characteristics of the motor, a set of starting windings effective to produce a starting torque when the main windings are connected for high speed operation, a set of starting windings effective to produce a starting torque when the main windings are connected for low speed operation, and means for disconnecting said starting windings comprising an automatic cut-out having three separable segments, a connection from one of the segments to a source of power supply, a connection from another of said segments to the first mentioned set of starting windings, and a connection from the other segment to the second mentioned set of starting windings whereby said automatic cut-out will be effective to disconnect either of the starting windings.

CLINTON H. DEDERICK.